United States Patent Office 2,816,136
Patented Dec. 10, 1957

2,816,136

PROCESS FOR THE PRODUCTION OF ALKALI AND ALKALINE-EARTH-METAL SALTS OF CYANODITHIOIMIDOCARBONIC ACID

John D. Pera, Memphis, Tenn., assignor to Buckman Laboratories, Inc., Memphis, Tenn., a corporation of Tennessee No Drawing. Application October 22, 1956,
Serial No. 617,278

6 Claims. (Cl. 260—500)

The present invention relates to processes for the production of water-soluble salts of cyanodithioimidocarbonic acid with alkali and alkaline-earth metals.

In prior application Serial No. 494,286, filed March 14, 1955, now abandoned of which this application is a continuation-in-part, are described uses of alkali and alkaline-earth-metal salts of cyanodithioimidocarbonic acid as bactericides, particularly for inhibiting microbiological deterioration of organic substances susceptable to deterioration by the action of microorganisms and inhibiting the formation of slime in aqueous fluids that are in contact with such substances. In the said prior application is also described a new method which permits the production of these salts of cyanodithioimidocarbonic acid in greater yields, from more readily available starting materials, and in fewer process steps, than heretofore were specified. The description and claims of this application are directed specifically to this novel process of producing water-soluble salts of cyanodithiomidocarbonic acid. Other subject matter disclosed originally in application Serial No. 494,286 is claimed in continuation-in-part application Serial No. 671,396, filed July 12, 1957.

Methods which were heretofore described for the production of salts of cyanodithioimidocarbonic acid included the following processes based on the reactions specified:

(1) Reaction of isoperthiocyanic acid (xanthane hydride) with an aqueous solution of an alkali-metal hydroxide, which may be represented as:

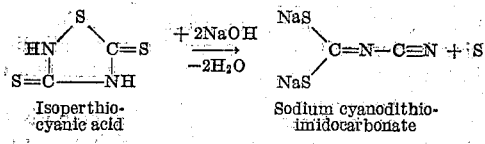

Isoperthio-                      Sodium cyanodithio-
cyanic acid                    imidocarbonate In his original preparation by this method, Klason (J. prakt. Chem., 1888, Series 2, vol. 38, page 366) prepared the potassium salt of cyanodithioimidocarbonic acid by treating isoperthiocyanic acid at room temperature with potassium hydroxide. Isoperthiocyanic acid is obtainable by the reaction of ammonium or an alkali-metal thiocyanate with a mineral acid, but yields in this conversion are low.

(2) Reaction in alcoholic solution of cyanamide and carbon disulfide in the presence of an alkali, which may be represented as:

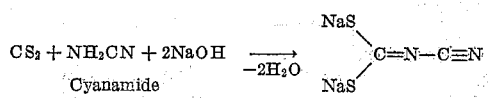

Hantzsch and Wolvekampf (Annalen, 1904, vol. 331, page 265) used this method of preparation and elucidated the structure of the cyanodithioimidocarbonic that is formed in this and the foregoing reaction.

Cyanamide can be obtained in aqueous solution by dissolving commercial calcium cyanamide in 4 parts of cold water, cooling the solution in ice and passing a current of carbon dioxide therethrough; calcium cyanamido-carbonate forms as an insoluble deposit. The insoluble deposit is separated by filtration, suspended in water, and decomposed with carbon dioxide. Calcium carbonate, which thus precipitates out, is removed by filteration, and the filtrate is an aqueous solution of cyanamide.

In a preferred process in accordance with the present invention, calcium cyanamide and carbon disulfide are stirred together in water. The reaction mixture, which contains the calcium salt of cyanodithioimidocarbonic acid in solution, may then be treated with sodium carbonate (if the more-soluble sodium salt is desired) and the precipitated calcium carbonate and other undissolved substances (impurities from the calcium cyanamide or other source) are separated by filtration, leaving an aqueous solution of the sodium salt of cyanodithioimidocarbonic acid. These reactions may be represented as:

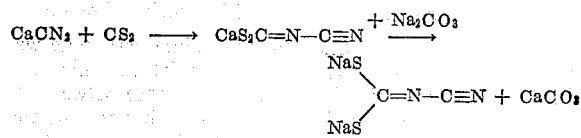

When the calcium salt of cyanodithioimidocarbonic acid is the desired product, the mixture resulting after the reaction of carbon disulfide and calcium cyanamide in aqueous suspension need only be filtered to remove unreacted starting materials and impurities. Since calcium cyanodithioimidocarbonate is only about one-half as soluble in water as the corresponding sodium salt, the amount of water used should be such as to dissolve or extract all the product calcium salt from the insoluble impurities.

Compared to the other two available processes, the process of the present invention permits the production of aqueous solutions of water-soluble salts of cyanodithioimidocarbonic acid directly and at lower cost than either. It accomplishes this with a minimum of procedural steps and provides a more efficient and complete utilization of commercial calcium cyanamide, since the yields in the reaction are substantially 100 percent of the stoichiometric based upon the content of calcium cyanamide in the commercial or crude product used.

In its generic aspect, the process of the present invention comprises simply the reaction of carbon disulfide with calcium or other alkaline-earth-metal cyanamide in an aqueous medium. The resulting alkaline-earth-metal salt in aqueous solution can then be converted by metathesis to an alkali-metal salt in conventional manner, for example, the calcium salt can be converted to sodium or potassium salts by adding sodium or potassium carbonate to the solution, thereby precipitating the water-insoluble calcium carbonate, which can be removed by filtration, leaving the alkali-metal cyanoditioimidocarbonate in the filtrate.

The process of this invention is exemplified in the examples which follow, which are to be understood to be preferred and not restrictive embodiments of the invention.

*Example 1.—Calcium cyanodithioimidocarbonate*

A mixture of 35.4 grams (0.257 mole) of calcium cyanamide (58 percent CaCN₂), 19.5 grams (0.257 mole) of carbon disulfide and 160 milliliters of water was stirred and maintained in a flask provided with a reflux condenser at a temperature between 40 and 45° C. (104 to 113° F.) until the carbon disulfide had dissolved, as determined by the cessation of refluxing of carbon disulfide. The insoluble matter (impurities in the calcium cyanamide and product exceeding the amount that is soluble in the quantity of water used) was separated by filtration and the resulting deep-yellow-colored filtrate consisted of a saturated solution containing approximately 14.4 percent by weight of calcium cyanodithioimidocarbonate ($CaS_2CNCN$). Further quantities of calcium cyanodithioimidocarbonate were recovered by extracting the filter cake with water.

*Example 2.—Sodium cyanodithioimidocarbonate*

A mixture of 350 pounds (2.54 pound molecular equivalents) of calcium cyanamide (58 percent) and 190 pounds, 2.50 pound molecular equivalents) of carbon disulfide and 1400 pounds of water was stirred and maintained at 40 to 45° C. for several hours until the carbon disulfide had dissolved. To the reaction mixture was then added 250 pounds (2.36 pound molecular equivalents) of sodium carbonate and the mixture was filtered to remove the precipitated calcium carbonate and water-insoluble impurities originally present. The deep yellow filtrate consisted of an aqueous solution containing approximately 22 percent by weight of sodium cyanodithioimidocarbonate ($Na_2S_2CNCN$).

*Example 3.—Sodium cyanodithioimidocarbonate*

Example 2 was repeated but the sodium carbonate was added to the original starting reaction mixture, which was then stirred and maintained at a temperature between 40 and 45° C. The precipitated calcium carbonate and unreacted impurities were then separated by filtration, leaving an aqueous filtrate containing approximately 22 percent by weight of sodium cyanodithioimidocarbonate.

*Example 4.—Sodium cyanodithioimidocarbonate*

To a steam-jacketed reaction kettle provided with an agitator was charged 12,000 pounds of water, 3,470 pounds of commercial calcium cyanamide (industrial grade assaying 58 percent $CaCN_2$) and 1,920 pounds of carbon disulfide. The mixture was stirred and steam was injected into the jacket to initiate the reaction, which is exothermic, and the mixture was then controlled in such manner that the temperature was maintained at approximately 105° F., and stirred at this temperature for 1½ hours. Thereafter, 3,660 pounds of soda ash was added to the mixture while it was still at 105° F., and the mixture was stirred for a further period of ½ hour. Sulfur dioxide was then charged under the surface of the mixture until 210 pounds was dissolved therein, and the mixture was stirred for an additional ½ hour while still at 105° F. The mixture was then pumped without cooling to a slurry tank from which it was charged to an Eimco rotary vacuum filter. The filtrate was collected and the resulting filter cake was washed with water in an amount of approximately 6,000 pounds. The washings were recovered separately and used for preparation of a succeeding batch, as described in Example 5, directly following. The filter cake weighed approximately 4,200 pounds (dry weight). The weight of the recovered filtrate was approximately 19,000 pounds and its analysis showed it to contain approximately 3.64 percent nitrogen by weight, which corresponds to 21 percent by weight of sodium cyanodithioimidocarbonate.

*Example 5.—Sodium cyanodithioimidocarbonate*

The wash waters consisting of the 6,000 pounds recovered in Example 4 together with 6,000 pounds of wash waters collected from other prior batches, which had a specific gravity at 20° C. of approximately 1.05, corresponding to a content of sodium cyanodithioimidocarbonate of approximately 6 to 7 percent by weight, were charged to the reaction kettle specified in Example 4, together with 2,300 pounds of industrial grade calcium cyanamide and 1,270 pounds of carbon disulfide.

The mixture was stirred and maintained at approximately 105° F. for a period of 1½ hours, as described in Example 4. Then 2,410 pounds of soda ash was added, and the stirring was continued for ½ hour while the mixture was maintained at approximately 105° F. Ninety (90) pounds of sulfur dioxide was charged thereinto and, after stirring for an additional ½ hour as in Example 4, the mixture was pumped to the slurry tank, filtered, washed, and the filtrate and washings recovered as described in Example 4. The dry weight of the filter cake that was obtained was 2,740 pounds and the approximate yield was 13,000 pounds of a 21 percent by weight solution of sodium cyanodithioimidocarbonate assaying 3.64 percent by weight of nitrogen.

In practicing the process of the invention, it is not necessary to use the exact dilutions specified herein. For obvious reasons it is desirable to conduct the reaction in such manner as to produce a saturated solution of the water-soluble alkali-metal or alkaline-earth-metal salt and thereafter to dilute the product to desired concentrations. The temperature of the reaction is also not critical but care should be exercised so that the exothermic reaction which is initiated does not reach such a rate that it becomes uncontrollable in the equipment provided. The temperature should preferably be above approximately 100° F. (37.8° C.), since the reaction, if it is allowed to proceed below this temperature, is extremely slow. A temperature of approximately 150° F. may be regarded as a practical upper plant operating limit.

The proportions of the alkaline-earth-metal cyanamide and carbon disulfide reactants are not critical and the reaction will proceed with an excess of one or the other. Since the product desired is one consisting essentially of the desired salt and the reaction proceeds substantially quantitatively to produce the desired salt, it is necessary to use proportions that are essentially stoichiometrically equivalent and consequently it is also desirable, in using commercial calcium cyanamide or, as in Example 5, wash waters containing recovered salts of cyanodithioimidocarbonic acid, to analyze the starting reagents and apportion them in accordance with assays thus obtained. This is especially desirable if the calcium cyanamide comes from a batch which had not previously been analyzed or a long period had elapsed since its last assay.

For the preparation of the corresponding potassium salt, potassium carbonate may be substituted for the soda ash or sodium carbonate in the foregoing examples, and proceeding otherwise as therein described. If less than equimolecular proportions of alkali-metal carbonate are used, the resulting solution will contain salts of both the alkali and alkaline-earth-metals. The barium salt can be prepared most conveniently from barium cyanamide in exactly the same manner as is described herein for production of calcium salt from calcium cyanamide, and the resulting barium salt can be converted to an alkali-metal salt in the same manner, for example, by addition of an alkali-metal carbonate.

Inasmuch as the foregoing specification comprises preferred embodiments of the invention, which were selected merely for purposes of illustration, it is to be understood that variations and modifications may be made therein in conventional manner and in accordance with the teachings hereof, without departing from the invention or its scope as defined in the appended claims.

What is claimed is:

1. A process for the production of a water-soluble salt of cyanodithioimidocarbonic acid which comprises the treatment of an aqueous dispersion of an alkaline-earth-metal cyanamide with carbon disulfide at a temperature above approximately 100° F., and subsequently recovering the resulting water-soluble salt of cyanodithioimidocarbonic acid.

2. A process for the production of calcium cyanodithioimidocarbonate which comprises the treatment of an aqueous dispersion of calcium cyanamide with carbon disulfide at a temperature above approximately 100° F., and subsequently recovering the calcium cyanodithioimidocarbonate.

3. A process for the production of an aqueous solution of an alkali-metal cyanodithioimidocarbonate which comprises the treatment of an aqueous dispersion of calcium cyanamide with carbon disulfide at a temperature above approximately 100° F., adding a sufficient amount of an alkali-metal carbonate to convert the calcium cyanodithioimidocarbonate in solution to the corresponding alkali-metal salt and precipitate the calcium as calcium carbonate, and subsequently separating the calcium carbonate and insoluble solids from the resulting solution.

4. A process as defined in claim 3 in which the alkali-metal salt is the sodium salt.

5. A process for the preparation of an aqueous solution of calcium cyanodithioimidocarbonate which comprises the treatment of an aqueous dispersion of calcium cyanamide with carbon disulfide at a temperature above approximately 100° F., and subsequently separating the precipitated solids therefrom.

6. A process as defined in claim 1 in which the carbon disulfide and alkaline-earth-metal cyanamide are initially present in the reaction mixture in approximately equimolecular proportions.

No references cited.